Patented Sept. 22, 1942

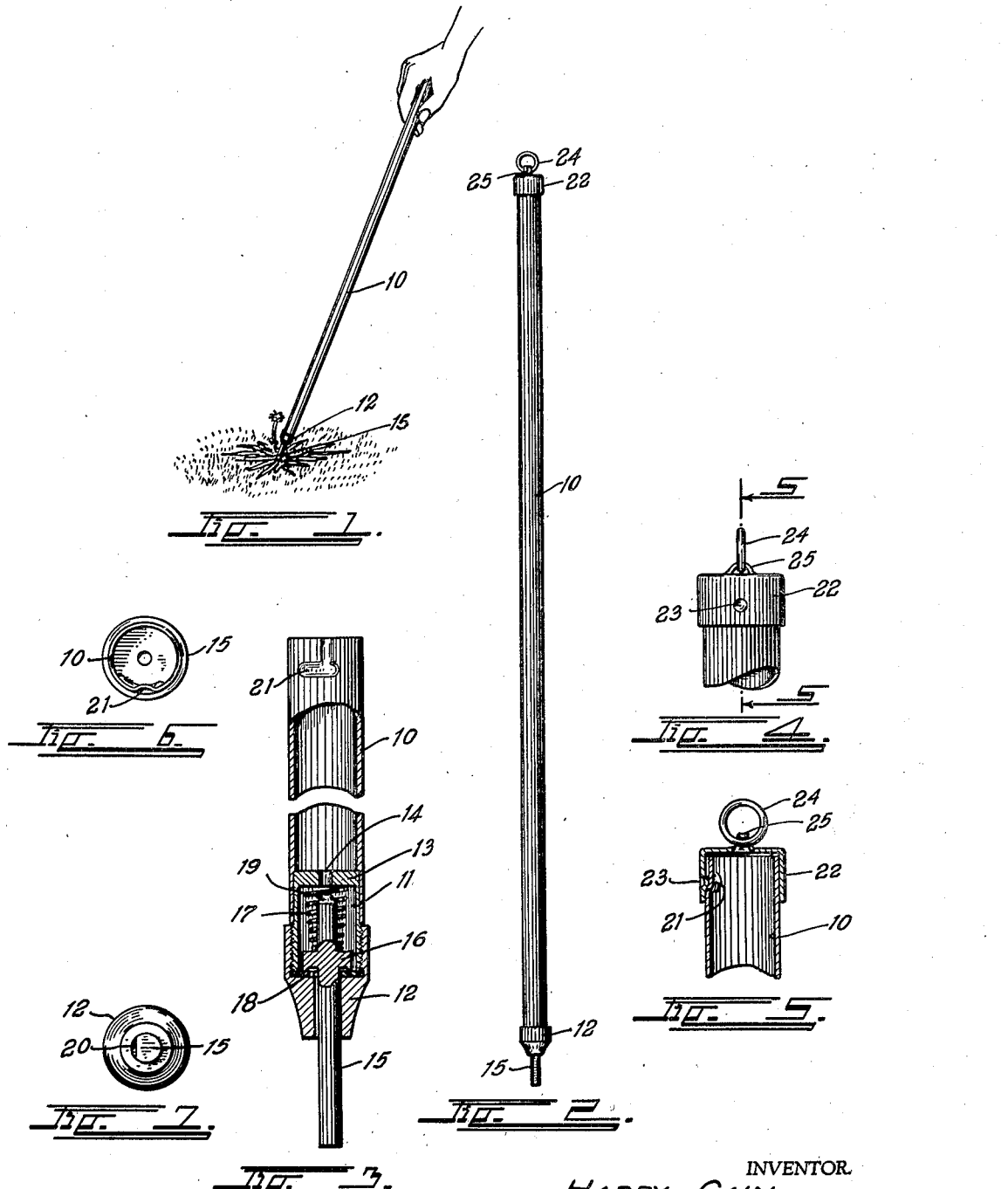

2,296,500

UNITED STATES PATENT OFFICE 2,296,500

WEED EXTERMINATOR

Harry Cain, Denver, Colo.

Application August 30, 1940, Serial No. 354,847

1 Claim. (Cl. 47—49)

This invention relates to a weed poisoning device more particularly for the removal of such weeds as dandelions, plantain, etc.

The principal object of the invention is to provide a neat, light, easily used device which will resemble a slender cane and which will be so designed that when the lower extremity is pressed against a dandelion a measured amount of poisonous liquid will be discharged thereon to penetrate the root system of the plant and eradicate the latter.

Other objects and advantages reside in the detail construction of the invention, which is designed for simplicity, economy, and efficiency. These will become more apparent from the following description.

In the following detailed description of the invention reference is had to the accompanying drawing which forms a part hereof. Like numerals refer to like parts in all views of the drawing and throughout the description.

In the drawing:

Fig. 1 illustrates the improved dandelion poisoner in use.

Fig. 2 is a side view thereof.

Fig. 3 is a detail, fragmentary, enlarged section through the valve portion of the invention.

Fig. 4 is a detail view of the closure cap.

Fig. 5 is a detail section through the closure cap, taken on the line 5—5, Fig. 4.

Fig. 6 is a top view of the device with the cap removed.

Fig. 7 is a bottom view thereof.

The invention consists of a tubular cane 10 normally open at both extremities and preferably formed from thin walled seamless tubing. The bottom of the cane is closed by means of a cylindrical valve cage 11 which is forced or otherwise secured therein. The cage 11 is threaded to receive a guide tip member 12.

The upper extremity of the cage 11 is closed by means of a head 13 having a central discharge port 14. A plunger 15 extends downwardly through an axially positioned bearing opening in the tip member 12 and is enlarged within the cage 11 to form a valve disc 16. A compression spring 17 constantly urges the disc 16 downwardly against a valve sealing gasket 18 which is positioned in the lower extremity of the cage 11 against the top face of the tip member 12.

The plunger 15 extends above the valve disc 16 to a point slightly below the port 14 and is tapered as shown at 19 to enter the port 14 and act as a valve therein. One side of the plunger 15 is flattened or cut away as indicated at 20.

The upper extremity of the cane 10 has a bayonet type groove 21 impressed therein. This groove is for the purpose of holding a cap 22 in place thereon. The cap is formed with an indentation 23 to enter the bayonet groove 21 to hold the cap in place. The cap is preferably provided with a hanging ring 24 which is looped through a stamped loop 25 formed in the cap.

To fill the device, the cap 22 is given a partial turn to release it from the bayonet groove 21 and the hollow interior of the cane 10 is filled with suitable plant poisoning fluid. The cap is then replaced and the indentation 23 is turned to lock it in the bayonet groove.

The plunger 15 is now placed over the mid-portion of the plant which it is desired to eradicate and given a downward pressure. This causes the head 12 to move downwardly from the valve 16 and almost simultaneously causes the tapered extremity of the plunger to close the port 14. This allows the charge of fluid in the cage 11 to flow downwardly through the head and along the flat side 20 of the plunger to the plant.

Only the fluid in the cage can discharge since the remainder of the fluid in the cane is stopped by the head 19 on the plunger. As soon as the cane is lifted from the plant the valve disc 16 immediately seats and the port 14 opens to refill the cage.

The stamped loop 25 in the cap also serves as an air vent to allow air to enter to replace the discharging fluid.

While a specific form of the improvement has been described and illustrated herein, it is desired to be understood that the same may be varied, within the scope of the appended claim, without departing from the spirit of the invention.

Having thus described the invention, what is claimed and desired secured by Letters Patent is:

A plant poisoning device comprising: a tubular cane; a cylindrical valve cage pressed into the lower extremity of said cane; a head in the upper extremity of said valve cage provided with a port, the lower extremity of said valve cage being exteriorly threaded; a tip member threaded onto said valve cage and having an axially positioned bearing opening; a plunger extending from said cage through said bearing opening and projecting below said tip member; a valve disc surrounding said plunger within said cage; a valve gasket supported by said tip member at the bottom of said cage to cooperate with said valve disc to seal the cage; a tapered upper extremity on said plunger positioned below said port; a compression spring compressed between the head of the cage and the valve disc to constantly urge the latter against said gasket; and a flattened side on said plunger to provide a fluid passage through the guide bearing.

HARRY CAIN.